(12) United States Patent
Furuhashi

(10) Patent No.: US 6,567,908 B1
(45) Date of Patent: May 20, 2003

(54) METHOD OF AND APPARATUS FOR PROCESSING INFORMATION, AND PROVIDING MEDIUM

(75) Inventor: Makoto Furuhashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/346,673

(22) Filed: Jul. 2, 1999

(30) Foreign Application Priority Data

Jul. 3, 1998 (JP) .......................... 10-188622

(51) Int. Cl.⁷ .......................... G06F 12/00; G06F 12/04
(52) U.S. Cl. .......................... 711/211; 711/212; 711/215; 711/1
(58) Field of Search .......................... 711/104, 123, 711/3, 1, 211, 212, 215

(56) References Cited

U.S. PATENT DOCUMENTS

| | | | |
|---|---|---|---|
| 4,534,011 A | * 8/1985 | Andrews et al. | 710/58 |
| 5,185,878 A | * 2/1993 | Baror et al. | 711/123 |
| 5,280,598 A | 1/1994 | Osaki et al. | |
| 5,485,594 A | * 1/1996 | Foster | 711/100 |
| 5,499,355 A | * 3/1996 | Krishnamohan et al. | 711/137 |
| 5,594,877 A | 1/1997 | Lentz et al. | |
| 5,619,728 A | 4/1997 | Jones et al. | |
| 5,768,608 A | 6/1998 | Nakamura | |
| 5,983,023 A | * 11/1999 | Moriwaki et al. | 712/32 |

FOREIGN PATENT DOCUMENTS

EP  0 243 189 A1  10/1987
EP  0 681 241 A1  11/1995

OTHER PUBLICATIONS

U.S. patent application Ser. No. 09/339,815 by Makoto Furuhashi, filed on Jun. 25, 1999, status pending.
U.S. patent application Ser. No. 09/339,220 by Makoto Furuhashi, filed on Jun. 24, 1999, status pending.

* cited by examiner

*Primary Examiner*—Matthew Kim
*Assistant Examiner*—Matthew D. Anderson
(74) *Attorney, Agent, or Firm*—Paul A. Guss

(57) ABSTRACT

An information processing apparatus has a DRAM for storing at least predetermined data, a system bus to which the DRAM is connected, a CPU for controlling the DRAM, and a CPU bus to which the CPU is connected. The information processing apparatus also has an SRAM connected to the system bus and the CPU bus, for storing data transferred from the DRAM, an address counter for generating an address of the SRAM based on an initial value, and a DMA controller for controlling data transfer between the DRAM and the SRAM using the address generated by the address counter. At a certain time, the DMA controller outputs an address D2 next to an initial address in the DRAM via the system bus to the DRAM, reads data B from the address D2, and outputs the data B via the system bus to the SRAM. At the same time, the address counter increments a stored address S1 into an address S2, and outputs the address S2 to the SRAM, which stores the data B at the address S2. Using the address generated on the basis of the initial value, data can efficiently be transferred between the system bus and the CPU bus in synchronism with clock cycles.

12 Claims, 6 Drawing Sheets

METHOD OF AND APPARATUS FOR PROCESSING INFORMATION, AND PROVIDING MEDIUM

BACKGROUND OF THE INVENTION

1. Field of the Invention

The present invention relates to a method of and an apparatus for processing information, and a providing medium for providing programs and data, and more particularly to a method of and an apparatus for transferring programs and data efficiently in a video entertainment system which executes various programs, and a providing medium for providing programs and data.

2. Description of the Related Art

Generally, a DRAM (Dynamic Random-Access Memory) incorporated in one chip allows the bit width of a data bus to be established freely, and can provide a high bandwidth when it is compatible with multiple bit widths.

Conversely, a CPU (Central Processing Unit) cannot be connected to a bus which has the number of bits greater than the number of bits handled by the CPU. Usually, the bit width of a CPU is smaller than the bit width of a DRAM.

Therefore, if a DRAM and a CPU are installed together on one chip, then the bit width of the data bus has to match the bit width of the CPU, with the result that the DRAM fails to offer its advantages.

Figure 5:
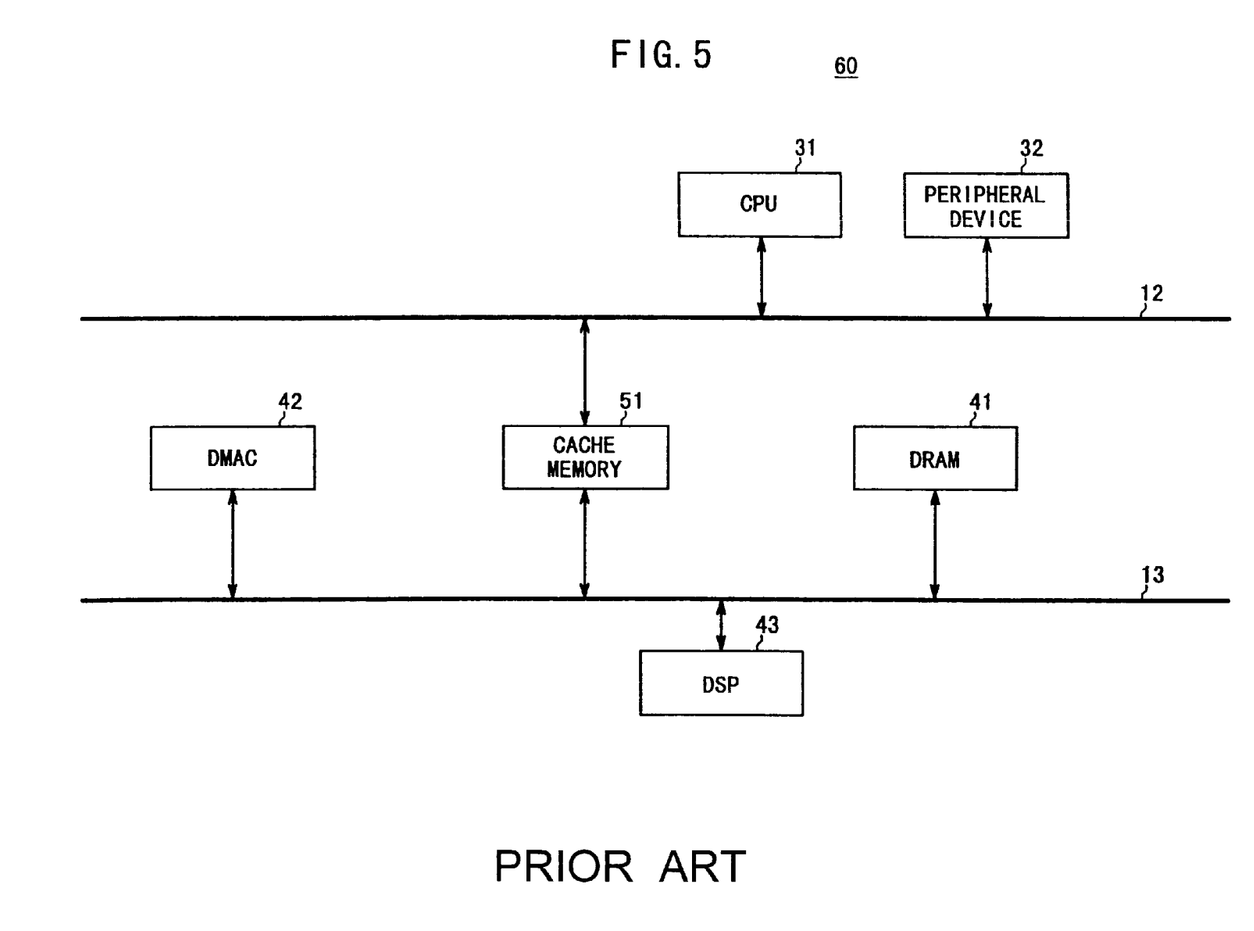
FIG. 5 is a block diagram of a conventional video entertainment system.

There is a situation where a DSP (Digital Signal Processor) is connected to a data bus and requires a high band-width between itself and a DRAM. FIG. 5 of the accompanying drawings shows a video entertainment system 60 that is designed for use in such a situation. As shown in FIG. 5, the video entertainment system 60 has a CPU bus 12 having a smaller bit width and a system bus (data bus) 13 having a larger bit width, with a DRAM 41 connected to the data bus 13.

For example, the CPU bus 12 is 32 bits wide and the system bus 13 is 128 bits wide, and these buses 12, 13 are used to transfer programs and data between various devices.

To the CPU bus 12, there are connected a CPU 31, a peripheral device 32, and a cache memory 51. To the system bus 13, there are connected the cache memory 51, the DRAM 41, a DMA (Direct Memory Access) controller (DMAC) 42, and a DSP 43.

The CPU 31 is supplied with a program transferred from the DRAM 41 via the cache memory 51, and executes a certain process according to the supplied program. The CPU 31 can also be supplied with data from the DRAM 41 via the cache memory 51.

The peripheral device 32 comprises a timer for performing clock operation and an interrupt controller for generating interrupt pulses at preset periodic intervals.

The DRAM 41 is arranged to store data necessary for the CPU 31 and the DSP 43 to operate and also programs to be executed by the CPU 31 and the DSP 43. The cache memory 51 stores programs and data to be supplied to the CPU 31, which have been read from the DRAM 41.

In response to a request from the CPU 31 or the DSP 43, the DMA controller 42 transfers programs or data from the DRAM 41 to the cache memory 51 or the DSP 43.

The DSP 43 executes programs supplied from the DRAM 41.

The CPU 31 usually accesses the cache memory 51 via the CPU bus 12, reads a necessary program and data from the cache memory 51, and executes the program and processes the data. The DSP 43 executes a program and processes data which have been transferred from the DRAM 41 via the system bus 13 under the control of the DMA controller 42.

Since the video entertainment system 60 has the CPU bus 12 and the system bus 13 that are provided separately from each other, the system bus 13, which is a data bus having a large bit width, can be connected to the DRAM 41 without being limited by the bit width of the CPU 31. As a result, data can be transferred at a high rate between the DRAM 41 and the DSP 43.

The cache memory 51 stores programs and data that are accessed highly frequently from the CPU 31. However, the cache memory 51 occasionally causes a cache error, i.e., fails to store necessary programs and data. While stored programs are sequentially read from the cache memory 51 by the CPU 31, stored data are frequently requested and read randomly from the cache memory 51 by the CPU 31. For this reason, many cache errors occur with respect to the data stored in the cache memory 51. When a cache error takes place, the CPU 31 needs to request the DMA controller 42 to transfer data from the DRAM 41 to the cache memory 51 according to a DMA (Direct Memory Access) data transfer process. This data transfer operation places an extra burden on the CPU 31, which then fails to perform high-speed processing.

Figure 6:
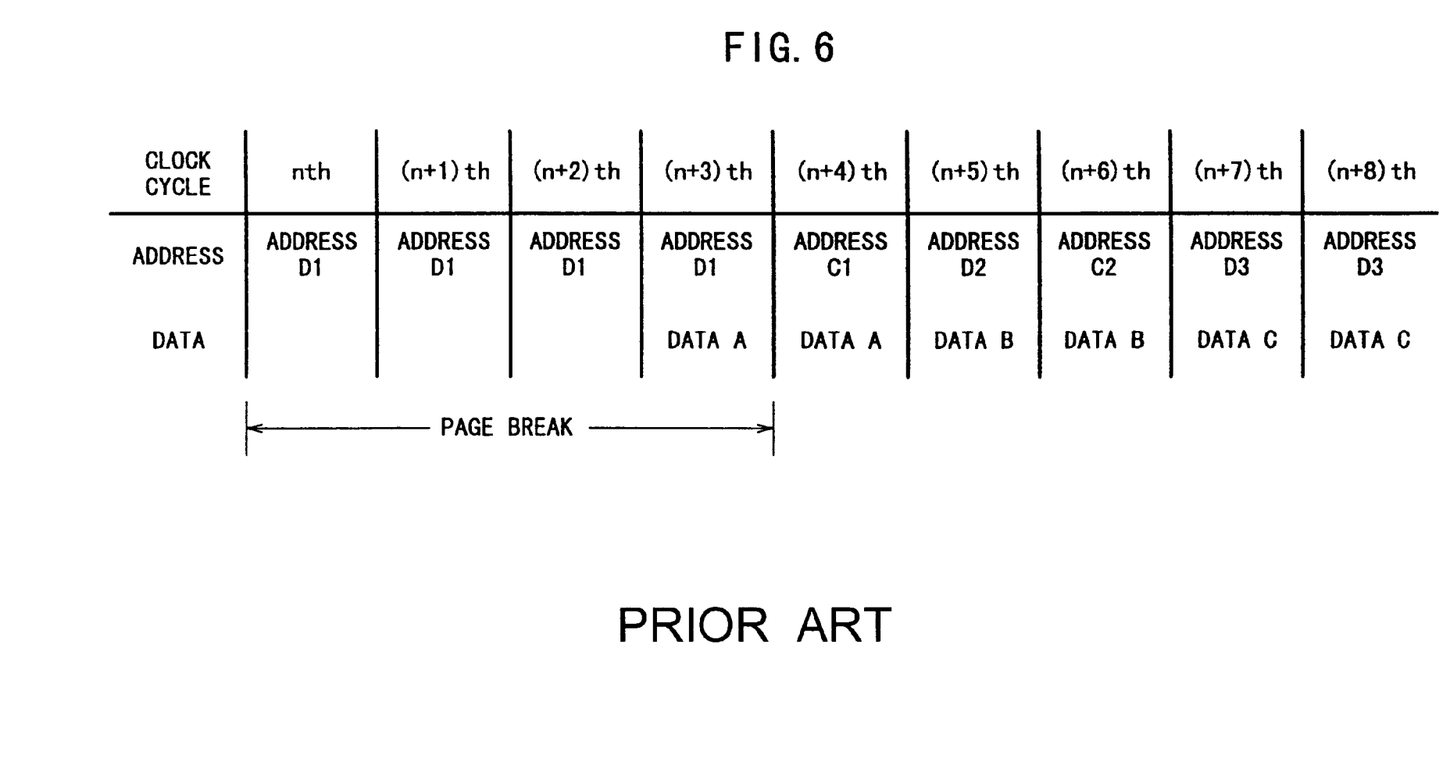
FIG. 6 a flowchart of a processing sequence of a DMA data transfer process carried out by the conventional video entertainment system shown in FIG. 5.

When the DRAM 41 transfers data to the cache memory 51 according to the DMA data transfer process in the event of a cache error, the DMA controller 42 outputs an address indicative of the storage location in the DRAM 41 of data to be transferred to the cache memory 51, to DRAM 41, and controls the transfer of the data while outputting an address indicative of the storage location in the cache memory 51 of the data to the cache memory 51. FIG. 6 of the accompanying drawings is a timing chart illustrative of the data transfer from the DRAM 41 to the cache memory 51 according to the DMA data transfer process.

The DMA controller 42 starts transferring data from the DRAM 41 to the cache memory 51 according to the DMA data transfer process at the timing of the nth clock cycle (hereinafter referred to as "nth clock timing") of a system clock signal. A request from the CPU 31 includes an initial address in the DRAM 41 of data to be transferred to the cache memory 51, the amount (size) of the data to be transferred to the cache memory 51, and an initial address in the cache memory 51 for storing the data to be transferred from the DRAM 41.

As shown in FIG. 6, at the nth clock timing, the DMA controller 42 outputs the initial address (address D1) in the DRAM 41 via the system bus (address bus) 13 to the DRAM 41, and instructs the DRAM 41 to read data (data A) stored in the address.

The DRAM 41 usually stores pages of programs and data. If the DRAM 41 reads data, for example, within a page, then the DRAM 41 can perform the reading process relatively quickly. However, if the DRAM 41 reads a plurality of pages of data, then since a page break occurs between pages of data, the DRAM 41 virtually stops its operation for a certain period of time, i.e., four clock pulses in the illustrated example, in that page break.

Normally, in the DMA data transfer process, the data that the DRAM 41 initially transfers is often not related to the data that the DRAM 41 previously processed, and the DRAM 41 suffers a page break between these data. Specifically, the DRAM 41 remains inactive up to a point immediately prior to the timing of the (n+4)th clock cycle, and cannot output the data (data A) to the cache memory 51 until the (n+4)th clock timing.

The DMA controller 42 outputs the initial address (address D1) in the DRAM 41 via the system bus (address bus) 13 to the DRAM 41, and waits until the data A is outputted from the DRAM 41 to the system bus (data bus) 13. As shown in FIG. 6, after the DRAM 41 outputs the data A to the system bus (data bus) 13 at the timing of the (n+3)th clock cycle, the DMA controller 42 outputs an initial address (write address) (address C1) in the cache memory 51 via the system bus (address bus) 13 to the cache memory 51 at the timing of the (n+4)th clock cycle. The cache memory 51 now stores the data (data A) on the system bus (data bus) 13 from the DRAM 41 into the address C1 thereof.

Then, at the timing of the (n+5)th clock cycle, the DMA controller 42 outputs an address (address D2) next to the initial address in the DRAM 41 as a read address to the DRAM 41, and instructs the DRAM 41 to read data B stored in the address D2. The DRAM 41 now outputs the data B to the system bus (data bus) 13. At the timing of the (n+6)th clock cycle, the DMA controller 42 outputs an address (address C2) next to the initial address in the cache memory 51 as a write address via the system bus (address bus) 13 to the cache memory 51, and instructs the cache memory 51 to write the data B. The cache memory 51 now stores the data (data B) on the system bus (data bus) 13 from the DRAM 41 into the address C2 thereof.

At the timing of the (n+7)th clock cycle and the timing of the (n+8)th clock cycle, the DMA controller 42 operates in the same manner as at the timing of the (n+5)th clock cycle and the timing of the (n+6)th clock cycle, for transferring data C from the DRAM 41 to the cache memory 51 according to the DMA transfer process.

In this manner, the DMA controller 42 is required to output read and write addresses alternately to the DRAM 41 and the cache memory 51 via the common address bus in timed relation to the clock signal. One problem with the DMA controller 42 is that it cannot transfer data efficiently because only one item of data is transferred in two clock cycles.

SUMMARY OF THE INVENTION

It is therefore an object of the present invention to transfer data and programs efficiently at a higher rate.

With an apparatus for processing information, a method of processing information, and a providing medium according to the present invention, programs and data are separately stored between a first bus and a second bus. Thus, a control means can obtain necessary data more efficiently.

With an apparatus for processing information, a method of processing information, and a providing medium according to the present invention, data is transferred using an address generated on the basis of an initial value between a first bus and a second bus. Therefore, data can efficiently be transferred.

With an apparatus for processing information, a method of processing information, and a providing medium according to the present invention, data can be transferred via a second control means. Consequently, a large amount of data can be transferred at a high rate.

The above and other objects, features, and advantages of the present invention will become more apparent from the following description when taken in conjunction with the accompanying drawings in which a preferred embodiment of the present invention is shown by way of example.

DESCRIPTION OF THE PREFERRED EMBODIMENT

Various means of the present invention referred to in claims are implemented by corresponding parts in parentheses given in the next paragraph. However, the various means should not be interpreted as being limited to these parts only.

An information processing apparatus according to the present invention has a first memory means (e.g., a DRAM 41 shown in FIG. 1) for storing programs and data, a first bus (e.g., a system bus 13 shown in FIG. 1) to which the first memory means is connected, a control means (e.g., a CPU 31 shown in FIG. 1) for controlling the first memory means, and a second bus (e.g., a CPU bus 12 shown in FIG. 1) to which the control means is connected, and also comprises a second memory means (e.g., an SRAM 33 shown in FIG. 1) connected to the first bus and the second bus, for storing data to be supplied to the control means, of the data stored in the first memory means, and a third memory means (e.g., an instruction cache 34 shown in FIG. 1) connected to the first bus and the second bus, for storing programs to be supplied to the control means, of the programs stored in the first memory means.

The information processing apparatus further comprises a converting means (e.g., a bit converter 35) connected to the first bus (e.g., the system bus 13 shown in FIG. 1) and the second bus (e.g., the CPU bus 12 shown in FIG. 1), for converting the bit width of data inputted via the first bus into a bit width matching the second bus.

An information processing apparatus according to the present invention has a first memory means (e.g., a DRAM 41 shown in FIG. 1) for storing predetermined data, a first bus (e.g., a system bus 13 shown in FIG. 1) to which the first memory means is connected, a first control means (e.g., a CPU 31 shown in FIG. 1) for controlling the first memory means, and a second bus (e.g., a CPU bus 12 shown in FIG. 1) to which the first control means is connected, and also comprises a second memory means (e.g., an SRAM 33 shown in FIG. 1) connected to the first bus and the second bus, for storing data transferred from the first memory means, a generating means (e.g., an address counter 36 shown in FIG. 1) for generating an address of either one of the first memory means and the second memory means based on an initial value, and a second control means (e.g., a DMA controller 42 shown in FIG. 1) for establishing the initial value in the generating means for generating an address in response to a request from the first control means, and controlling data transfer between the first memory means and the second memory means, using the address generated by the generating means.

An information processing apparatus according to the present invention has a first memory means (e.g., a DRAM 41 shown in FIG. 1) for storing programs and data, a first bus (e.g., a system bus 13 shown in FIG. 1) to which the first memory means is connected, a first control means (e.g., a CPU 31 shown in FIG. 1) for controlling the first memory means, a second bus (e.g., a CPU bus 12 shown in FIG. 1) to which the first control means is connected, a second control means (e.g., a host CPU 21 shown in FIG. 1) for controlling the first memory means and the first control means, and a third bus (e.g., a host bus 11 shown in FIG. 1) to which the second control means is connected, and also comprises an adjusting means (e.g., an FIFO memory 22 shown in FIG. 1) connected to the first bus and the third bus, for temporarily storing data outputted from the second control means and adjusting the timing to output the stored data, a third control means (e.g., a DMAC 42 shown in FIG. 1) for controlling data transfer between the second control means and the first memory means, and a second memory means (e.g., a register 23 shown in FIG. 1) connected to the second bus and the third bus, for storing data for use in communications between the first control means and the second control means.

The information processing apparatus further comprises a communicating means (e.g., a second direct path 24b shown in FIG. 1) for allowing the second control means and the first memory means to communicate directly with each other.

Figure 1:
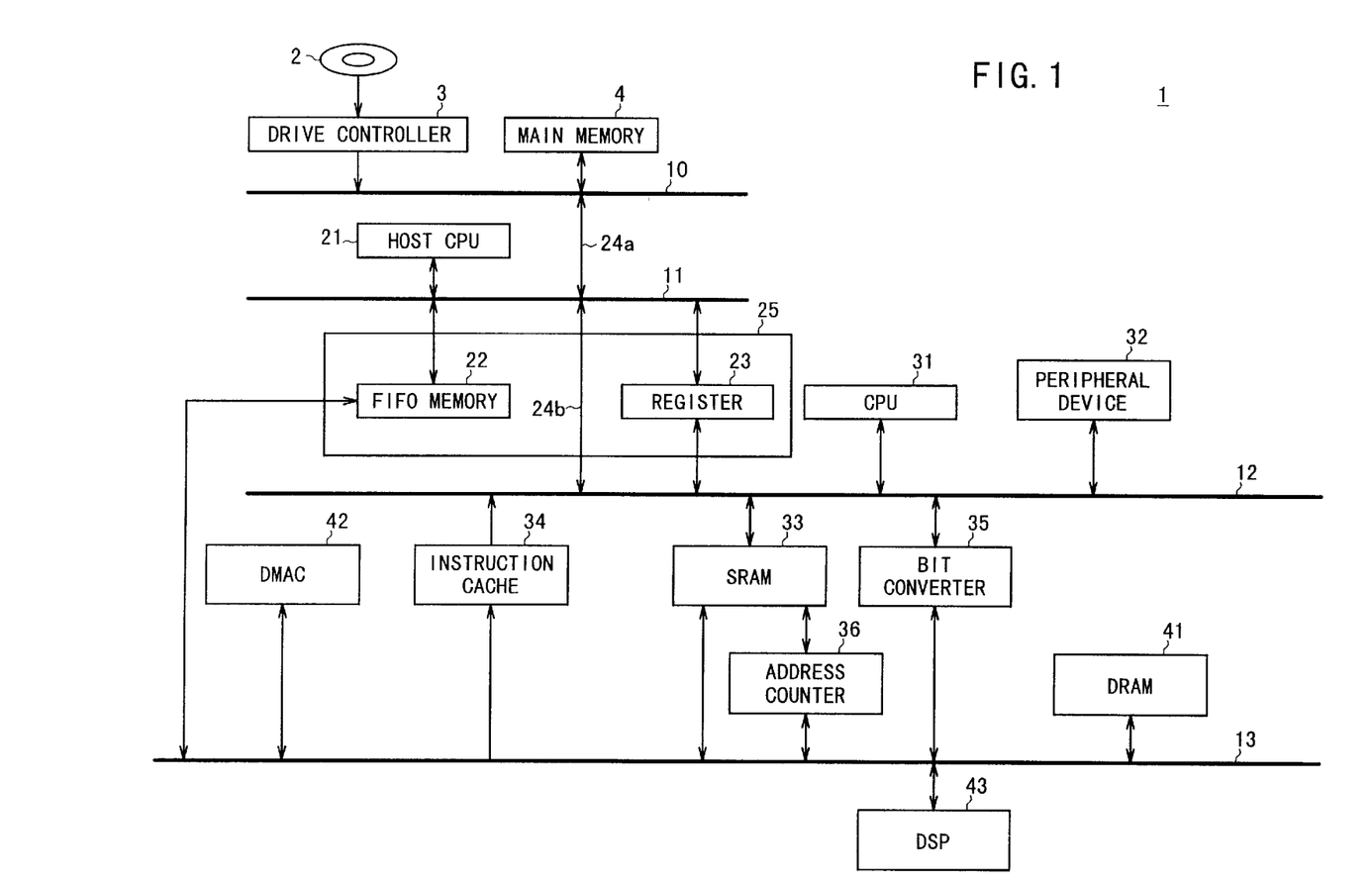
FIG. 1 is a block diagram of a video entertainment system according to the present invention.

FIG. 1 shows a video entertainment system 1 for executing various programs, which incorporates an information processing apparatus according to the present invention. Those parts of the video entertainment system 1 which are identical to those of the video entertainment system 60 shown in FIG. 5 are denoted by identical reference characters, and will not be described in detail below.

The video entertainment system 1 has four buses, i.e., a main bus 10, a host bus 11, a CPU bus 12, and a system bus 13. To the main bus 10, there are connected a drive controller 3 for recording data in and/or reproducing data from a recording medium 2, and a main memory 4.

To the host bus 11, there are connected a host CPU 21 and a host interface 25. The main bus 10 and the host bus 11 are connected to each other by a first direct path 24a for the host CPU 21. The host interface 25 comprises an FIFO memory 22, a register 23, and a second direct path 24b for the host CPU 21. The FIFO memory 22, the register 23, and the second direct path 24b are connected to the host bus 11.

To the CPU bus 12, there are connected the register 23, the second direct path 24b, a CPU 31, a peripheral device 32, an SRAM 33, an instruction cache 34, and a bit converter 35. To the system bus 13, there are connected the FIFO memory 22, the SRAM 33, the instruction cache 34, the bit converter 35, a DRAM 41, a DMA controller 42, an address counter 36, and a DSP 43.

The host CPU 21 executes various processes according to programs transferred from the recording medium 2 via the drive controller 3 to the main memory 4.

For example, the host CPU 21 can store programs and necessary data from the main memory 4 into the DRAM 41, and acquire programs and data stored in the DRAM 41. Specifically, when the host CPU 21 sends a request via the register 23 to the CPU 31, the CPU 31 controls the DMA controller 42 to effect a DMA data transfer process for transferring programs and data between the FIFO memory 22 and the DRAM 41. The host CPU 21 can also directly access the DRAM 41 and other devices via the second direct path 24b. The DMA controller 42 also functions as an arbiter for the system bus 13 (bus arbiter).

The FIFO memory 22 temporarily stores data outputted from the host CPU 21 and outputs the stored data via the system bus 13 to the DMA controller 42, and also temporarily stores data outputted from the DMA controller 42 and outputs the data to the host CPU 21. The register 23 is a register used when handshaking takes place between the host CPU 21 and the CPU 31, and stores commands and data representing processing statuses.

The CPU 31 accesses the instruction cache 34, loads a program stored therein, executes the program, and, if necessary, accesses the SRAM 33 and is supplied with certain data therefrom. If necessary data is not stored in the SRAM 33, then the CPU 31 requests the DMA controller 42 to perform DMA data transfer from the DRAM 41 to the SRAM 33. If a program required by the CPU 31 is not stored in the instruction cache 34, the instruction cache 34 reads the program from the DRAM 41.

The SRAM 33 comprises a dual-port SRAM and used as a data cache, for example, and can be accessed at arbitrary addresses from both the CPU 31 and the DMA controller 42 at the same time for reading and writing data. The SRAM 33 serves to store those of the data stored in the DRAM 41 which are accessed highly frequently from the CPU 31. The SRAM 33 may be of a 2-bank memory arrangement, with one bank connected to the CPU bus 12 and the other bank to the system bus 13. The SRAM 33 also serves to store data at addresses generated by the address counter 36.

The instruction cache 34 is a memory cache whose arbitrary addresses can be accessed for reading data therefrom. The instruction cache 34 serves to store those of the programs stored in the DRAM 41 which are accessed highly frequently from the CPU 31.

The bit converter 35 converts the bit width of data entered via the CPU bus 12 to a bit width matching the system bus 12 and outputs the data with the changed bit width, and also changes the bit width of data entered via the system bus 13 to a bit width matching the CPU bus 12 and outputs the data with the changed bit width.

The address counter 36 is connected to the system bus 13, and is also connected to the SRAM 33. The address counter 36 increments an initial address that has been initialized to generate addresses for the SRAM 33, and outputs the generated addresses to the SRAM 33.

Of the data stored in the DRAM 41, the data that are accessed highly frequently from the CPU 31 are stored in the SRAM 33 separately from programs. Therefore, the data that are required by the CPU 31 can be stored efficiently.

Figure 2:
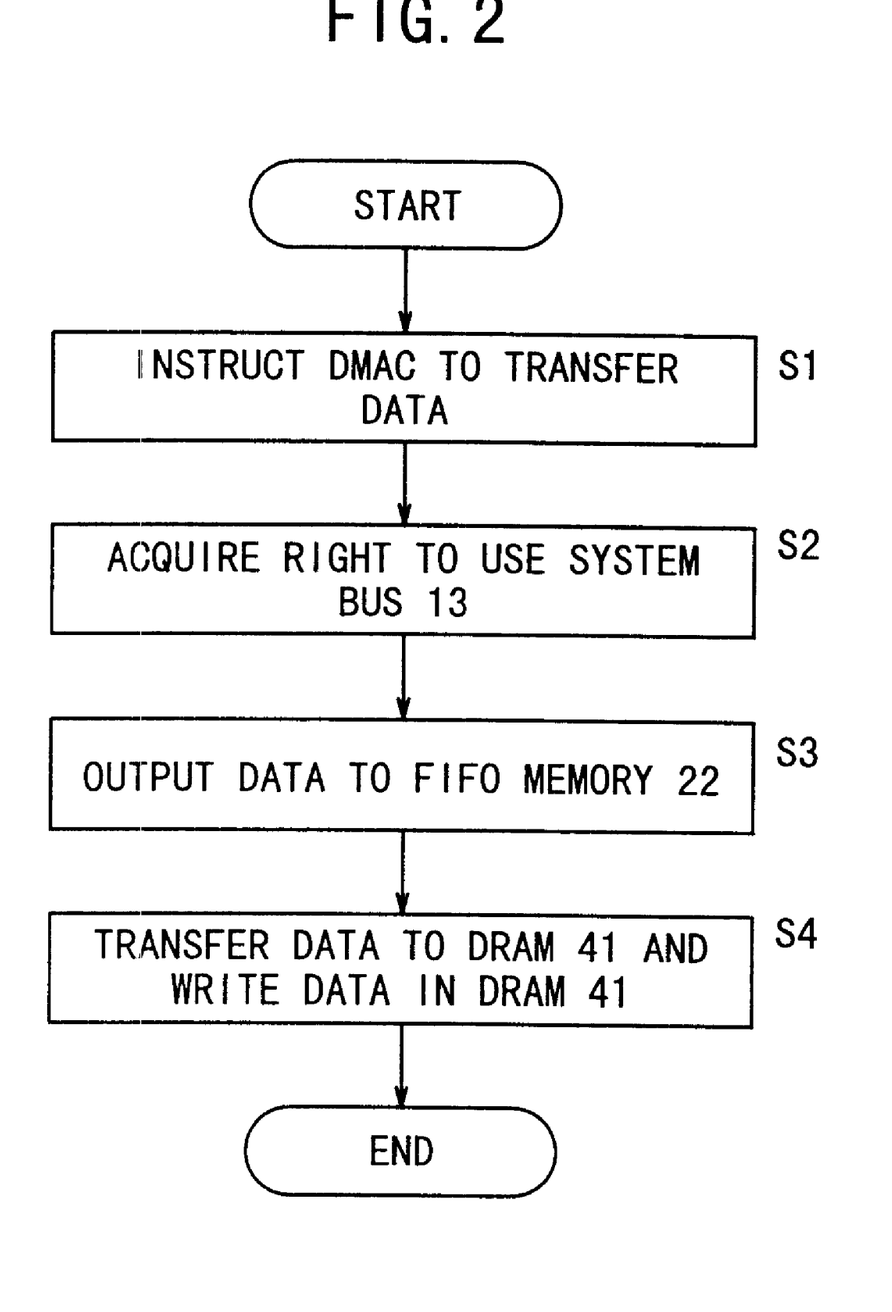
FIG. 2 is a flowchart of a processing sequence of a DMA data transfer process carried out by the video entertainment system shown in FIG. 1.

A processing sequence of a DMA data transfer process for transferring programs and data from the host CPU 21 to the DRAM 41 will be described below with reference to FIG. 2

In step S1, the host CPU 21 instructs the DMA controller 42 to transfer programs and data stored in a memory (not shown) (if programs and data do not need to be distinguished from each other, then they will be referred to as "programs and/or data"). In step S2, in response to the instruction from the host CPU 21, the DMA controller 42 arbitrates the right to use the system bus 13 between itself and the CPU 31 and the DSP 43, and acquires the right to use the system bus 13.

In step S3, the host CPU 21 outputs programs and/or data to be transferred to the DRAM 41 to the FIFO memory 22. In step S4, the DMA controller 42 transfers the programs and/or data of the FIFO memory 22, i.e., the programs and/or data outputted from the host CPU 21, via the system bus 13 to the DRAM 41 according to the DMA data transfer process, and stores the programs and/or data in the DRAM 41.

Thus, the host CPU 21 can transfer programs and/or data to the DRAM 41 and write them in the DRAM 41 in bypassing relation to the CPU 31. Consequently, the host CPU 21 can transfer a large quantity of programs and/or data to the DRAM 41 and write them in the DRAM 41 at a high rate without placing a burden on the CPU 31. Similarly, the host CPU 21 can request the DMA controller 42 to transfer programs and/or data stored in the DRAM 41 to the FIFO memory 22 according to the DMA data transfer process, and acquire the transferred programs and/or data from the FIFO memory 22.

Of the programs and data thus stored in the DRAM 41, the programs are stored in the instruction cache 34. Thereafter, the CPU 31 accesses the instruction cache 34 to read a necessary program therefrom.

For reading data stored in the DRAM 41, the CPU 31 requests the DMA controller 42 to transfer desired data of the data stored in the DRAM 41 to the SRAM 33 according to the DMA data transfer process. Thereafter, the CPU 31 accesses the SRAM 33 to read necessary data therefrom.

According to the above processing sequence, the probability that a cache error occurs is reduced. However, the possibility of the occurrence of a cache error is not eliminated. When a cache error occurs, the CPU 31 needs to transfer necessary data from the DRAM 41 to the SRAM 33.

A DMA data transfer process for transferring data from the DRAM 41 to the SRAM 33 will be described below with reference to FIG. 3.

In response to a request from the CPU 31, the DMA controller 42 gains the right to use the system bus 13, and starts transferring data from the DRAM 41 to the SRAM 33 according to the DMA data transfer process at the timing of an nth clock cycle. The request from the CPU 31 includes an initial address (read address) in the DRAM 41 of data to be transferred to the SRAM 33, the amount of the data to be transferred to the SRAM 3 (data at seven addresses in the illustrated embodiment), and an initial address (write address) in the SRAM 33 for storing the data read from the DRAM 41 in the SRAM 33.

Figure 3:
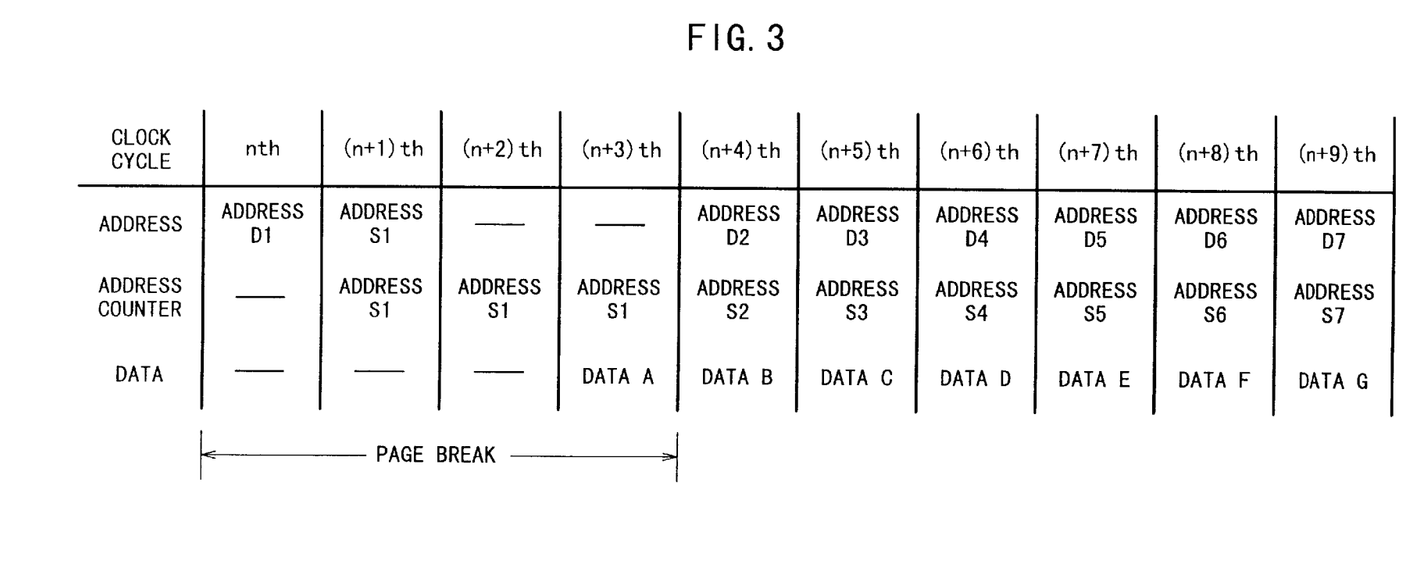
FIG. 3 is a timing chart illustrative of a DMA data transfer process.

As shown in FIG. 3, at the timing of the nth clock cycle, the DMA controller 42 outputs the initial address (address D1) in the DRAM 41 via the system bus (address bus) 13 to the DRAM 41, and instructs the DRAM 41 to read data (data A) stored in the address.

At this time, the DRAM 41 suffers a page break for a certain period of time, i.e., four clock pulses in the illustrated embodiment, and virtually stops its operation. The DRAM 41 is unable to output the data (data A) to the system bus (data bus) 13 up to a point immediately prior to the timing of the (n+3)th clock cycle.

Then, at the timing of the (n+1)th clock cycle, the DMA controller 42 outputs an initial address (address S1) in the SRAM 33 and a data size via the system bus (address bus) 13 to the address counter 36. The address counter 36 sets the address S1 as an initial value, and outputs the address S1 as a write address to the SRAM 33. Therefore, when the SRAM 33 subsequently receives data from the DRAM 41, the SRAM 33 can write the received data at the write address.

At the timing of the (n+3)th clock cycle, the DRAM 41 recovers from the page break, and reads the data A from the initial address (address D1) in the DRAM 41, and outputs the data A to the system bus (data bus) 13. Since the SRAM 33 has already been supplied with the write address S1, the SRAM 33 stores the data A at the address S1.

At the timing of the (n+4)th clock cycle, the DMA controller 42 outputs an address (address D2) next to the initial address in the DRAM 41 as a read address to the system bus (address bus) 13, and instructs the DRAM 41 to read data B stored in the address D2. In response to the instruction, the DRAM 41 reads the data B from the address Dd2, and outputs the data B to the system bus (data bus) 13. At the same time, the address counter 36 increments the stored address S1 into an address S2, and outputs the address S2 to the SRAM 33. Since the DMA controller 42 instructs the SRAM 33 to write the data B at the same time, the SRAM 33 stores the data B at the address S2.

Since the DMA controller 42 does not output any addresses from the timing of the (n+1)th clock cycle when it outputs the address S1 to the timing of the (n+4)th clock cycle when it outputs the address D2, no effective addresses are present on the system bus (address bus) 13 at the timing of the (n+2)th clock cycle and the timing of the (n+3)th clock cycle.

At the timing of the (n+5)th clock cycle and subsequent clock cycles, as at the timing of the (n+4)th clock cycle, data are transferred from the DRAM 41 to the SRAM 33. When the SRAM 33 stores the data of the given size, i.e., data at seven addresses in the illustrated embodiment (the data A through the data G), the transfer of the data according to the DMA data transfer process is completed.

In this manner, after the DMA controller 42 sets the address counter 36 to the initial address in the SRAM 33, the address counter 36 generates write addresses for the SRAM 33 and outputs the generated write addresses to the SRAM 33. Consequently, the DMA controller 42 is not required to output write addresses to the SRAM 33, but only needs to output read addresses for the DRAM 41 to the system bus (address bus) 13.

The DMA controller 42 is thus capable of transferring data according to the DMA data transfer process from the DRAM 41 to the SRAM 33 at the timing of one clock cycle. While the DRAM 41 is suffering a page break, the DMA controller 42 outputs an initial address in the SRAM 33 to the address counter 36. Therefore, the overhead in the first data transfer cycle can be held to a minimum.

In the above description, the address counter 36 is arranged to generate write addresses (addresses for the SRAM 33). However, the address counter 36 may be arranged to generate read addresses (addresses for the DRAM 41).

As described above, if the SRAM 33 does not store necessary data, then the CPU 31 transfers the data from the DRAM 41 to the SRAM 33 according to the DMA data transfer process. Subsequently, the CPU 31 accesses the SRAM 33 and reads the data from the SRAM 33.

If the CPU 31 does not need to access the SRAM 33 (DRAM 41) many times, i.e., if the size of data required by the CPU 31 is relatively small, then in view of the time required to transfer data between the DRAM 41 and the SRAM 33, it may be faster for the CPU 31 to directly access the DRAM 41 to read the data therefrom than to read the data via the SRAM 33.

Figure 4A:
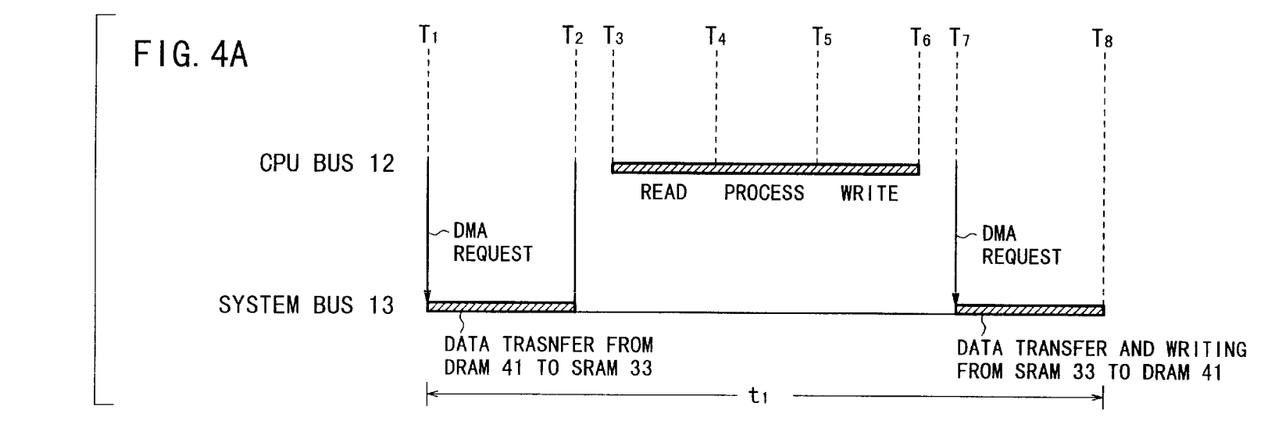
FIG. 4A is a timing chart of a process in which a CPU reads data from a DRAM via an SRAM.
Figure 4B:
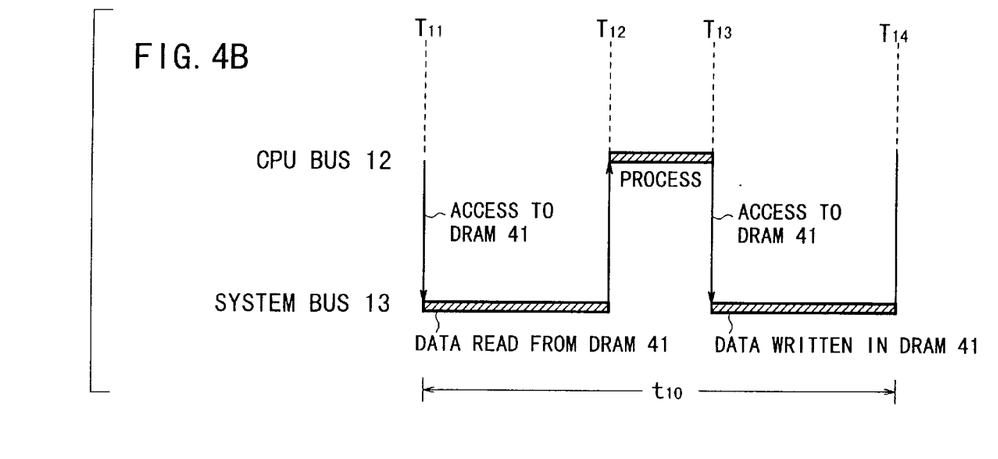
FIG. 4B is a timing chart of a process in which a CPU reads data directly from a DRAM.

FIG. 4A shows a timing chart of a process in which the CPU 31 reads data from the DRAM 41 via the SRAM 33 when the amount of data handled by the CPU 31 is relatively small. FIG. 4B shows a timing chart of a process in which the CPU 31 directly accesses the DRAM 41 to read data therefrom.

The timing chart shown in FIG. 4A illustrates a process in which the CPU 31 accesses the SRAM 33 and executes a certain program. In the example shown in FIG. 4A, the program executed by the CPU 31 reads certain data, processes the read data, and stores the processed data in the DRAM 41. The process shown in FIG. 4A will be described below.

At a time T1 in FIG. 4A, the CPU 31 requests the DMA controller 42 to transfer data from the DRAM 41 to the SRAM 33 according to the DMA data transfer process. In response to the request from the CPU 31, the DMA controller 42 acquires the right to use the system bus 13, and starts transferring data from the DRAM 41 to the SRAM 33 according to the DMA data transfer process.

At a time T2, the DMA controller 42 finishes the transfer of data from the DRAM 41 to the SRAM 33. At a next time T3, the CPU 31 accesses the SRAM 33 and starts reading the transferred data via the CPU bus 12.

At a time T4, the CPU 31 finishes the reading of the data from the SRAM 33, and starts processing the read data. When the CPU 31 finishes the processing of the data at a time T5, the CPU 31 starts to store the processed data in the SRAM 33 via the CPU bus 12. At a next time T6, when the CPU 31 finishes the storage of the processed data in the SRAM 33, the CPU 31 requests the DMA controller 42 to acquire the right to use the system bus 13. At a time T7, the DMA controller 42 starts transferring the processed data from the SRAM 33 to the DRAM 41 according to the DMA data transfer process. At a time T8, the DMA controller 42 finishes the transfer of the data from the SRAM 33 to the DRAM 41.

The timing chart shown in FIG. 4B illustrates a process in which the CPU 31 directly accesses the DRAM 41 via the bit converter 35 and executes a certain program. In this example, the program executed by the CPU 31 is the same as the program in the example shown in FIG. 4A. That is, the program executed by the CPU 31 reads certain data, processes the read data, and stores the processed data in the DRAM 41. The process shown in FIG. 4B will be described below.

At a time T11, the CPU 31 accesses the DRAM 41 via the bit converter 35 and starts reading certain data from the DRAM 41. The bit converter 35 serves to convert the bit width (128 bits) of the data read from the DRAM 41 to a bit width (32 bits) matching the CPU bus 12. The data which the CPU 31 reads from the DRAM 41 in the example shown in FIG. 4B is the same as the data which the CPU 31 reads from the SRAM 33 in the example shown in FIG. 4A.

At a time T12, the CPU 31 finishes the reading of the data from the DRAM 41, and starts processing the read data. The CPU 31 processes the data for a processing period (from the time T12 to a time T13) which is equal to the processing period (from the time T4 to the time T5) in the example shown in FIG. 4A. The processed data produced by the CPU 31 is the same as the processed data produced by the CPU 31 in the example shown in FIG. 4A.

At a time T13, the CPU 31 outputs the processed data via the bit converter 35 to the DRAM 41, and starts storing the processed data in the DRAM 41. The bit converter 35 converts the bit width of the data from the CPU 31 to a bit width matching the system bus 13, and outputs the data with the converted bit width to the DRAM 41. At a time T14, the CPU 31 finishes the writing of the data into the DRAM 41.

The overall processing times of the program in the examples shown in FIGS. 4A and 4B are compared with each other as follows: In the example shown in FIG. 4A, the processing time is t1 (from the time T1 to the time T8). In the example shown in FIG. 4B, the processing time is t10 (from the time T11 to the time T14). In the examples shown in FIGS. 4A and 4B, the time t1 is longer than the time t10. Therefore, the overall processing time of the program in the example shown in FIG. 4B is shorter than the overall processing time of the program in the example shown in FIG. 4A.

As described above, if the size of data to be processed is smaller, i.e., if the number of times that the DRAM 41 is accessed is smaller, then the required processing time is shorter when the CPU 31 directly accesses the DRAM 41 via the bit converter 35 for processing data than when the CPU 31 accesses the SRAM 33 for processing data.

While the present invention has been described as being embodied in a video entertainment system, the principles of the present invention are also applicable to any of various other information processing apparatus.

A providing medium for providing a computer program and/or data which carries out the above processing to the user may comprise any of various information recording mediums including a magnetic disk, a CD-ROM, a solid-state memory, etc., and any of various information transmission mediums used in networks and satellite systems, etc.

Although a certain preferred embodiment of the present invention has been shown and described in detail, it should be understood that various changes and modifications may be made therein without departing from the scope of the appended claims.

What is claimed is:

1. An apparatus for processing information, comprising:

a first memory means for storing programs and data;

a first bus, wherein said first memory means is directly connected to said first bus;

control means for controlling said first memory means;

a second bus, wherein said control means is directly connected to said second bus;

second memory means for storing data to be supplied to said control means, after said data to be supplied to said control means has been transferred from said first memory means to said second memory means, wherein said second memory means is directly connected to both said first bus and said second bus; and third memory means for storing programs to be supplied to said control means, after said programs to be supplied to said control means have been transferred from said first memory means to said third memory means, wherein said third memory means is directly connected to both said first and said second bus.

2. An apparatus according to claim 1, further comprising:

converting means connected to said first bus and said second bus, for converting the bit width of data inputted via said first bus into a bit width matching said second bus.

3. An apparatus for processing information, comprising:

first memory means for storing at least predetermined data;

a first bus, wherein said first memory means is directly connected to said first bus;

first control means for controlling said first memory means;

a second bus, wherein said first control means is directly connected to said second bus;

second memory means for storing data transferred from said first memory means, wherein said second memory means is directly connected to both said first bus and said second bus;

generating means for generating an address of either one of said first memory means and said second memory means based on an initial value; and second control means for establishing said initial value in said generating means for generating an address in response to a request from said first control means, and controlling data transfer between said first memory means and said second memory means, using the address generated by said generating means.

4. An apparatus according to claim 3, further comprising:

converting means connected to said first bus and said second bus, for converting the bit width of data inputted via said first bus into a bit width matching said second bus.

5. An apparatus for processing information, comprising:

first memory means for storing programs and data;

a first bus, wherein said first memory means is directly connected to said first bus;

first control means for controlling said first memory means;

a second bus, wherein said first control means is directly connected to said second bus;

second control means for controlling said first memory means and said first control means;

a third bus, wherein said second control means is directly connected to said third bus;

adjusting means for temporarily storing data outputted from said second control means and adjusting the timing to output the stored data, wherein said adjusting means is directly connected to both said first bus and said third bus;

third control means for controlling data transfer between said second control means and said first memory means; and second memory means for storing data for use in communications between said first control means and said second control means, wherein said second memory means is directly connected to both said second bus and said third bus.

6. An apparatus according to claim 5, further comprising:

converting means connected to said first bus and said second bus, for converting the bit width of data inputted via said first bus into a bit width matching said second bus.

7. A method of processing information in an information processing apparatus having first memory means for storing programs and data, a first bus, wherein said first memory means is directly connected to said first bus, control means for controlling said first memory means, a second bus, wherein said control means is directly connected to said second bus, second memory means, wherein said second memory means is directly connected to both said first bus and said second bus, and third memory means, wherein said third memory means is directly connected to both said first bus and said second bus, said method comprising the steps of:

storing data in said second memory means to be supplied to said control means, after said data to be supplied to said control means has been transferred from said first memory means to said second memory means; and storing programs in said third memory means to be supplied to said control means, after said programs to be supplied to said control means have been transferred from said first memory means to said third memory means.

8. A method of processing information in an information processing apparatus having first memory means for storing at least predetermined data, a first bus, wherein said first memory means is directly connected to said first bus, control means for controlling said first memory means, a second bus, wherein said control means is directly connected to said second bus, and second memory means for storing data transferred from said first memory means, wherein said second memory means is directly connected to, both said first bus and said second bus, said method comprising the steps of:

storing data transferred from said first memory means in said second memory means;

generating an address of either one of said first memory means and said second memory means based on an initial value; and establishing paid initial value for generating an address in response to a request from said first control means, and controlling data transfer between said first memory means and said second memory means, using the generated address.

9. A method of processing information in an information processing apparatus having first memory means for storing programs and data, a first bus, wherein said first memory means is directly connected to said first bus, first control means for controlling said first memory means, a second bus, wherein said first control means is directly connected to said second bus, second control means for controlling said first memory means and said first control means, a third bus, wherein said second control means is directly connected to said third bus, and second memory means, wherein said second memory means is directly connected to both said second bus and said third bus, said method comprising the steps of:

temporarily storing data outputted from said second control means and adjusting the timing to output the stored data;

controlling data transfer between said second control means and said first memory means; and storing data in said second memory means, for use in communications between said first control means and said second control means.

10. A providing medium for providing a program and/or data readable by a computer to control an information processing apparatus having first memory means for storing programs and data, a first bus, wherein said first memory means is directly connected to said first bus, control means for controlling said first memory means, a second bus, wherein said control means is directly connected to said second bus, second memory means, wherein said second memory means is directly connected to both said first bus and said second bus, and third memory means, wherein said third memory means is directly connected to both said first bus and said second bus, to carry out a process comprising the steps of:

storing data in said second memory means to be supplied to said control means, after said data to be supplied to said control means has been transferred from said first memory means to said second memory means; and storing programs in said third memory means to be supplied to said control means, after said programs to be supplied to said control means have been transferred from said first memory means to said third memory means.

11. A providing medium for providing a program and/or data readable by a computer to control an information processing apparatus having first memory means for storing at least predetermined data, a first bus, wherein said first memory means is directly connected to said first bus, control means for controlling said first memory means, a second bus, wherein said control means is directly connected to said second bus, and second memory means for storing data transferred from said first memory means, wherein said second memory means is directly connected to both said first bus and said second bus, to carry out a process comprising the steps of:

storing data transferred from said first memory means in said second memory means;

generating an address of either one of said first memory means and said second memory means based on an initial value; and establishing said initial value for generating an address in response to a request from said first control means, and controlling data transfer between said first memory means and said second memory means, using the generated address.

12. A providing medium for providing a program and/or data readable by a computer to control an information processing apparatus having first memory means for storing programs and data, a first bus, wherein said first memory means is directly connected to said first bus, first control means for controlling said first memory means, a second bus, wherein said first control means is directly connected to said second bus, second control means for controlling said first memory means and said first control means, a third bus, wherein said second control means is directly connected to said third bus, and second memory means, wherein said second memory means is directly connected to both said second bus and said third bus, to carry out a process comprising the steps of:

temporarily storing data outputted from said second control means and adjusting the timing to output the stored data;

controlling data transfer between said second control means and said first memory means; and storing data in said second memory means, for use in communications between said first control means and said second control means.

* * * * *